Sept. 10, 1946.   B. E. DEL MAR   2,407,257
REGULATING MEANS FOR PRESSURE CABINS
Filed Feb. 7, 1942   2 Sheets-Sheet 2
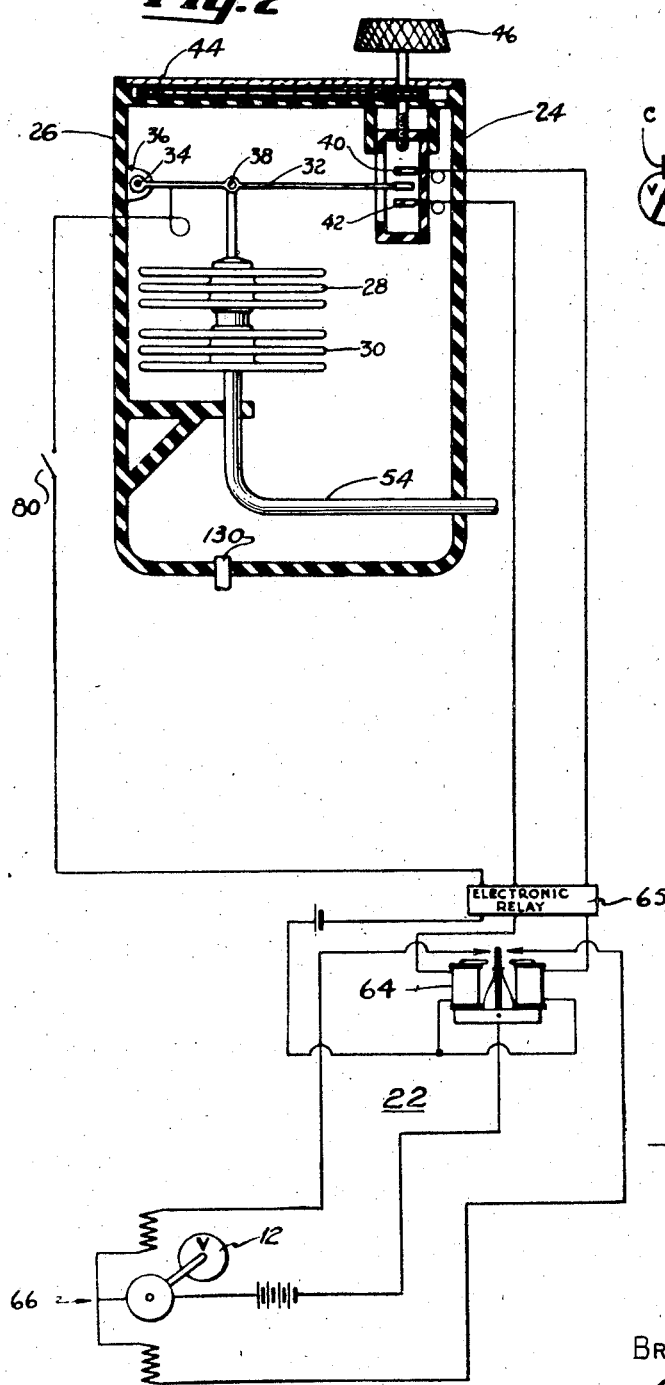
Fig. 2
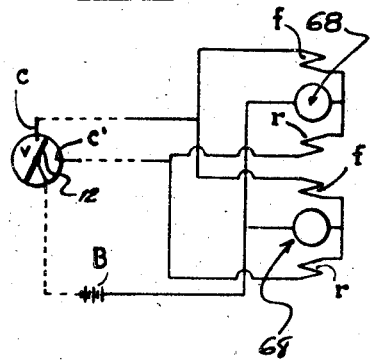
Fig. 3
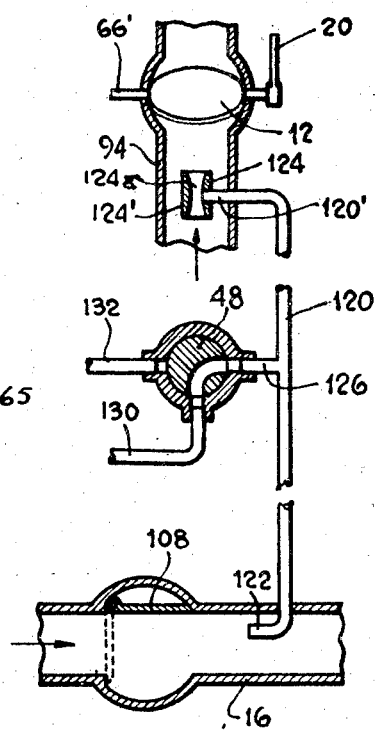
Fig. 4
Inventor
BRUCE E. DEL MAR
By
Attorney Patented Sept. 10, 1946

2,407,257

UNITED STATES PATENT OFFICE 2,407,257

REGULATING MEANS FOR PRESSURE CABINS

Bruce E. Del Mar, Los Angeles, Calif., assignor to Douglas Aircraft Company, Inc., Santa Monica, Calif., a corporation of Delaware Continuation of application Serial No. 285,216, July 18, 1939. This application February 7, 1942, Serial No. 429,901

14 Claims. (Cl. 98—1.5)

My invention relates to means for controlling the pressure in aircraft pressure cabins.

This application is a continuation of my sole invention originally disclosed in joint application, Serial No. 285,216, filed July 18, 1939, for Cabin pressure control, and relating to means for maintaining in the cabin of an aircraft flying at high altitude a pressure corresponding to a lower altitude so that the comfort of the passenger will be preserved. Many persons living ordinarily at low altitudes suffer considerable discomfort at altitudes of 12,000 feet or greater, and to all persons rapid changes of pressure cause discomfort.

Most aircraft passengers, however, can readily tolerate altitudes in the range of 5,000 to 10,000 feet, and, in view of this fact, it is structurally and mechanically advantageous to design a pressure cabin for a certain moderate pressure differential. It is then desirable to gradually reduce the cabin pressure during ascent at a lesser apparent rate of climb than that of the aircraft, but in a manner such that the permissible pressure differential is never exceeded. Similarly, during descent, the cabin pressure may be gradually raised in order to equal the existing ambient atmospheric pressure shortly before landing.

It is the principal object of my invention to provide an improved means for controlling pressure within an aircraft cabin in such manner that not only will predetermined pressure values be maintained within the range of altitude in which the aircraft is flown, but also rapid pressure changes within the cabin resulting from use of known pressure regulating equipment will be avoided and actual optimum passenger comfort and safety will be achieved.

Another object is to minimize the pressure changes to which occupants are subjected while the aircraft climbs or descends at a high rate or encounters bumpy air.

It is an object of the invention to provide with or in air flow and/or pressure regulating mechanism of any of the types suitable for control of the flow and pressure of air in an aircraft cabin, means for anticipating pressure changes and to compensate for or check such changes.

An additional object is to provide mechanism to compensate for surges and sudden changes in compressor air delivery and further to compensate for sudden variations in air exhaust.

The anticipator system which forms a principal part of the present invention has for its purpose to provide a means for anticipating pressure changes which will be produced in the cabin interior as the result of changes in air flow through either the air inlet duct or the air outlet duct of the cabin. This anticipator system is connected to the cabin pressure controlling means and causes the same to operate in a manner to anticipate changes in cabin pressure which the changes in air flow would effect if the outlet valves of the air system were not readjusted in accordance with the different relative rates of flow of air through the inlet and outlet ducts of the air system of the pressure cabin. By use of the present invention the condition known as hunting in the operation of control devices of this general character is reduced to a minimum.

Other and further objects will become apparent as the description proceeds.

For a clearer understanding of my invention, reference may be had to the drawings in which:

Fig. 2 is a partially sectional and partially schematic view of components of the pressure control system including a cabin pressure regulator, and the electrical system for controlling the cabin outlet valves.

Fig. 3 is a schematic diagram of an outlet valve limit switch system for controlling blower air delivery.

Fig. 4 is an explanatory view showing a two-way valve through which pressure enters the cabin pressure regulator, this view also showing the parts of the anticipator system which are connected through the valve with the cabin pressure regulator.

Fig. 5 is a fragmentary partly sectioned view showing a manner in which the inflow of air to the cabin may be controlled.

Figure 1:
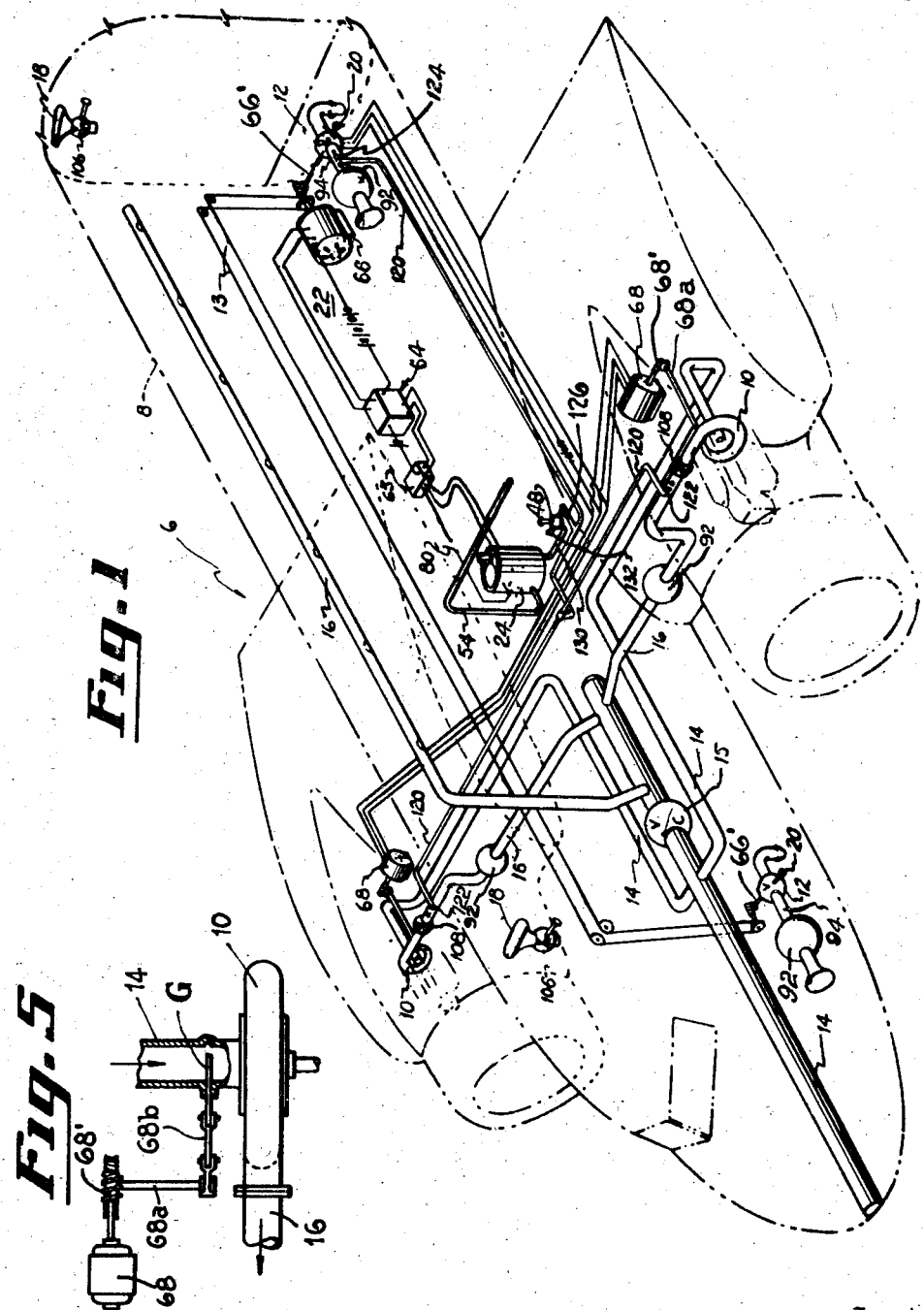
Fig. 1 is a perspective schematic view of an embodiment of my cabin pressure control system, a fragmentary portion of the aircraft being shown in phantom.

Referring now to the drawings, an airplane 6 having wings, fuselage, control surfaces, power plant, etc., is equipped with a cabin 8 adapted to withstand a desirable pressure differential, or, in other words, to be supercharged. Pressure in the cabin is supplied by one or more blowers 10 and is regulated primarily by one or more controlled cabin air outlet valves 12 which may be connected, as shown, by a cable 13 for simultaneous operation. The blowers receive fresh air preferably from the nose of the fuselage through a ram duct system 14, and deliver compressed air to the cabin through ducts 16 or through a conventional heating and ventilating system. The duct system 14 comprises three conduits, two of which lead directly to the blowers 10 and the other one of which leads directly to the cabin duct system.

The latter conduit is the largest of the three and incorporates a check valve 15 which is adapted to close the aft portion of this duct to incoming air as soon as the blowers begin operating and build up a pressure in the cabin greater than the flight ram pressure. In fact, my invention is such that there need be no difference in the distribution of fresh air or its temperature control mechanism, whether or not the cabin is supercharged. In order to accomplish supercharging or pressurizing, however, it is necessary that the cabin, cabin air exhaust valves, ducts and other associated parts be designed to withstand a pressure difference.

The controlled cabin air outlet valves 12, 12 are supplemented by larger overhead exhaust outlets 18 for discharging sufficient vitiated air from the cabin and lavatories in unsupercharged flight. These large outlets are especially needed to insure ample ventilation in hot weather. While I have shown only two controlled cabin air outlet valves 12, 12, there may be three or more in a passenger airplane, depending upon the cabin size, and these may be interconnected by suitable mechanism so as to act partly in series, partly in parallel. A plurality of these valves, differently located, is advantageous because, when flying supercharged, it is desirable to exhaust the air mostly from the lavatories or dressing rooms which may be situated at opposite ends of the cabin.

When ascending, and desiring to supercharge, the large outlets 18 are closed and the quantitative outlet control is turned over to the smaller valves 12, 12 which can be more accurately regulated and which preferably discharge into such unsupercharged fuselage portions as baggage and cargo compartments, thereby not only heating these portions but also precluding the possibility of icing occurring in the outlets. The control of the valves 12, 12 can be operated manually as by a handle 20 in case of emergency, but normally this control is effected automatically by a servo system, broadly referred to as 22, which is responsive to a cabin pressure regulator 24. In determining the effect of changes in the setting of the valves 12 upon the pressure in the cabin, consideration may be given to the escape of air which will inevitably occur through any leaks in the wall of the cabin as, for example, at fabricated joints. It is to be understood, therefore, that in referring, in the ensuing specification and claims, to the control of cabin pressure by controlling the cabin outflow, I do not intend to indicate that the entire outflow is controlled. Obviously the loss of air through unavoidable leaks is an uncontrolled outflow. However, the invention does provide for controlling a sufficiently large percentage of the outflow to exercise a fully effective control upon cabin pressure.

In general, the anticipating control mechanism functions in response to a differential in transient changes in the quantities of flow in the inlet and outlet means respectively to adjust the cabin pressure regulator so as to prevent any substantial deviation of cabin pressure from a prescribed maintenance value, bearing a predetermined relation to flight conditions. This maintenance value may at times be fixed, as, for example, when the plane is flying at a fixed altitude. At other times it may change, with changing altitudes, in accordance with a predetermined schedule. In any case, the invention functions to avoid any substantial departure from the predetermined maintenance value, whether the latter is fixed or changing in accordance with the predetermined schedule.

Although my invention may be used with various types of regulators, having rate of climb control, lag means, or a single element responding to and limiting cabin pressure, the regulator 24 I have shown as an example comprises a case 26 which houses a pair of coacting pressure sensitive units 28, 30, unit 28 being a sealed bellows, such as employed in aneroids, adapted to react to cabin pressure and unit 30 being a bellows having its interior connected through a duct 54 with the external atmosphere so that it will expand and contract in keeping with changes in the difference between cabin pressure and flight altitude pressure. A pointer or lever arm 32 is pivotally connected both at 34 to a bracket 36 fixed to the housing and at 38 to the coacting units. The lever arm is adapted to touch neither or either of two spaced contacts 40, 42 dependent upon pressure reactions of the units 28, 30. A scale 44, together with an index, is provided on the face of the instrument to indicate the regulator setting. Adjustment of the regulator is accomplished by a knob 46 to which the scale is geared for rotation. The contacts 40, 42 are also adjustable with relation to the lever 32 through the knob control.

As shown in Fig. 2, the cabin pressure unit 28 is an aneroid which is externally exposed to cabin pressure either directly or through a conduit 130 connected to a two-way valve 48 such as is shown in Fig. 4, and the unit 30 is a pressure diaphragm exposed to the pressure differential between flight altitude pressure and cabin pressure, the flight altitude pressure being carried to the unit through a conduit 54 which, as shown in Fig. 1, extends to the exterior of the cabin 8.

If an altitude ratio control of say 1 to 2 is desired, that is, cabin pressure controlled substantially halfway between flight altitude pressure and equalizing altitude pressure, and if the sensitivity of the two regulator units is alike, they can be merely superposed as shown in Fig. 2. That is to say, the aneroid 28 is mounted on the upper wall of the bellows 30. An increase in external flight pressure, transmitted through the duct 54 to the interior of the bellows 30, causes the same to expand vertically, lifting the aneroid 28 bodily and swinging the switch lever 32 upward. Likewise, a reduction in external flight pressure will be transmitted to the interior of the bellows 30, allowing the same to contract so as to lower the aneroid and swing the lever 32 downward. An increase in pressure within the case 26 of the device 24, which may be connected to the interior of the cabin through the pipe 130, will cause both the aneroid 28 and the bellows 30 to contract vertically, with the result that the lever 32 will be swung downward, and a decrease in the pressure in the case 26 will result in expansion of the members 28 and 30 and a raising of the lever 32. Accordingly, the position of the lever 32 at any time depends upon the relative pressures applied internally and externally to the aneroid 28 and the bellows 30, and when pressures in the case 26 and in the duct 54 define a proportion or ratio which is determined by the characteristics of the aneroid 28 and the bellows 30, the contact lever 32 will be positioned between the contacts 40 and 42. When cabin and flight pressure depart from this ratio, the lever 32 will be swung either upward or downward to engage either the contact 40 or the contact 42 to energize the control circuits whereby the required opening or closing of valves 12 may be accomplished.

The regulator performs three functions, one at a time; it actuates an increase servo system when an increase in cabin pressure is needed; or it actuates a decrease servo system when calling for a decrease of cabin pressure; or it actuates neither the increase nor decrease systems when the cabin pressure is substantially the pressure called for by the predetermined ratio of flight equalizing altitude pressure to cabin equalizing pressure.

The regulator actuates the servo systems through the electrical contacts 40, 42, between which the lever 32 plays, and a relay system 64, which may include an electronic relay 65 to prevent overloading the contacts.

The servo system includes a non-coasting clutch equipped motor 66 having reversed field windings and adapted for driving suitable reduction gears in either direction to control through rotation of shafts 66' the opening and closing of the outlet valves 12, 12 which in turn govern the area available for the flow of waste air from the cabin to the atmosphere. Should there be a decrease in cabin pressure or an increase in external pressure so that the ratio characteristic of the control means 28—30 is departed from, the lever 32 will be swung into engagement with the contact 40 and the relay 64 will be actuated so as to feed current through one of the field windings of the motor 66 to rotate the motor in a direction to produce a closing movement of the valves 12, thereby decreasing the outflow of air from the cabin and increase cabin pressure and restore the ratio. In a similar manner, an increase in cabin pressure or a decrease in flight pressure will result in movement of the lever 32 down into engagement with the contact 42, to actuate the relay 64 in the opposite direction and cause energization of the other field winding of the motor 66 and effectuate opening of the valves 12, whereupon the increased rate of flow of air from the cabin will cause a drop in cabin pressure to restore the ratio to the predetermined value characteristic of the members 28 and 30. At a given blower delivery rate and at a given altitude, the cabin pressure attained will become higher as the area of the outlet valves 12 is made smaller. The higher the flight altitude, the more the valves will have to be closed to maintain the desired cabin pressure. When the increase servo system is operating, the motor 66 is adapted to close the valves and when the decrease servo system is operating, the motor is reversed to open the valves. The speed of servo response may be varied by altering the speed of the motor. It may be mentioned that the servo controls may be electric, pneumatic, or otherwise.

In my invention the positions of the outlet valves 12 cooperate in controlling air flow into the cabin, and for this purpose a servo control is connected to the outlet valve mechanism so as to be actuated when the valves open or close beyond two or more set stations. As shown in Figs. 1 and 3, a motor 68 actuated by this control is provided for each blower 10 to decrease or increase the flow of fresh air by more or less throttling the flow or by slowing down or speeding up the blowers.

In Fig. 3 the outlet valve is shown as a butterfly vane 12, which, as shown in Figs. 1 and 6, is rotated by a shaft 66' adapted to be driven by the motor 66. A portion of this valve 12 may serve as a moving contact, and for this purpose it is connected to one terminal of a battery B, Fig. 3, the remaining terminal of which is connected to the motors 68 which are shown as being of reversible series wound type. The respective forward and reverse windings $f$ and $r$ of the motors 68 are connected to contacts $c$ and $c'$ disposed so as to be engaged by the movable contact or valve 12. When the valve 12 swings into engagement with the contact $c$, the windings $f$ of the motors 68 will be energized, and when the valve 12 engages the contact $c'$ the windings $r$ will be energized. As shown in Fig. 5, each motor 68, through worm gearing 68', a shaft 68a and linkage means 68b, operates a common form of valve or gate G in the air inlet pipe 14 leading to the associated blower 10 to vary the blower air production.

As previously indicated, my invention also includes an anticipator system or air pressure surge control, the objects of which are to minimize any hunting tendencies of the pressure regulating system and to increase the rapidity of regulator response to the trends of cabin pressure variation thereby anticipating as well as materially damping the amplitude of air pressure variations within the cabin and preventing surges of the cabin atmosphere. These objects can be obtained through the use of a conduit system 120 terminally connected at the supercharged pressure side of each blower 10 and at the cabin side of the rear outlet valve 12, and intermediately connected into the housing of the regulator being utilized for primarily controlling cabin pressure. This regulator, in the operation just described, would be the pressure regulator 24. The cabin pressure control is therefore provided with sensitivity to the duct inlet and outlet pressures of which the cabin pressure proper is a direct function. By properly locating between the inlet and outlet ends of the conduit 120, the point of communication between said conduit and the interior of the case 26 of the regulator 24, or by the proper arrangement of the flow responsive means at the ends of the conduit 120 in relation to the inlet and outlet means, it is possible to equate the pressure thus applied to the interior of the case 26 to the pressure produced within the cabin atmosphere proper, during the normal functioning of the apparatus. Thus the pressure existing within the case 26 may be caused to equal cabin pressure during normal operation of the apparatus and the aneroids 28 and 30 may be said to be normally responsive to cabin pressure. Cabin pressure, or simulated cabin pressure, is established in the case 26 during normal operation, as the function of the inlet and outlet pressures transmitted through the conduit 120. Pressure in the cabin atmosphere itself will of course also be a function of such inlet and outlet pressures, but, because of the large volume of cabin space, there is a definite time lag in the derivation of this function; whereas, the changes in simulated cabin pressure in the case 26 follow immediately the changes in flow conditions at the inlet and outlet, and thereby anticipate the corresponding changes which would occur in the cabin atmosphere except for the corrective functioning of the regulator which prevents the corresponding changes in cabin pressure under abnormal conditions such as transient fluctuations or sudden surges in the inlet and outlet flows.

As shown in Figs. 1 and 4, the inlet connection of the anticipator conduit 120 into duct 16 preferably comprises a Pitot tube 122, and the connection of the conduit into duct 94 ahead of the rear outlet valve 12 preferably comprises a Venturi tube 124 located within the outlet air flow duct 94. The purpose of this arrangement is to increase the pressure difference between cabin inlet and outlet for increasing the flow otherwise available therein and consequently improving the anticipator sensitivity. When anticipation is desired, the valve 48 connects the conduit 130 with a branch conduit which is connected in turn through piping 126 to the anticipator conduit 120.

As further shown in Fig. 4, the venturi 124 consists of a short tube 124' supported in the path of flow of air through the rear outlet duct 94 by the end 120' of the pipe 120 which communicates with the throat 124a of the tube 124'. Also, in Fig. 4 I have shown that the check valves 108 in the air ducts 16 may each comprise a flap valve of well known type.

In operation, air flows through the conduit 120 in response to pressure differentials existing in the supercharging and ventilating system; however, any surge in pressure at the inlet or cabin outlet causes a corresponding pressure change within the conduit 126 so that the pressure reacts through the valve 48 upon the pressure sensitive unit 24. Conduit 120 is, in effect, a flow system paralleling the air flow through the cabin proper. The greater sensitivity of the anticipation system then is accountable to the ratio of flow through the conduit 120, being greater in proportion to the volume of the branch conduits and the connected regulator housing than the ratio of main cabin ventilation in proportion to the cabin volume. Therefore, the regulating system is provided with a sensitivity which anticipates the trend of pressure changes in the cabin proper and it can counteract and control any surge before it becomes apparent in the cabin. The theory of operation of the anticipator system is as follows. The interior space of an aircraft cabin of a type intended for supercharging may be quite large; whereas, the volume of air contained within the cabin may be quite large, the volume of air fed thereinto during a unit of time is comparatively small, so that an appreciable period of time is required to produce a noticeable change of pressure in the cabin. Similarly, the flow of air out through the outlet valve of the cabin is relatively small as compared to the volume of the cabin, the result being that an excess flow of air through the outlet, as compared to the inlet flow of air through the air inlet, does not under ordinary valve control produce a rapid change in the pressure within the cabin. The result of this is that there may be a relatively rapid change in flight pressure without a corresponding change in cabin pressure, owing to the fact that the change in cabin pressure lags.

The aircraft cabin comprises an air chamber of large volume having an air inlet duct 16 and an air outlet duct 94. The interior of the piping 120, Fig. 1, comprises an air chamber of extremely small volume, this small air chamber being likewise fed with air through the inlet duct 16 and exhausted through the outlet duct 94. The pressure in the intermediate portion of the small chamber formed by the piping 120 is determined by the relation existing between the flow of air fed thereinto from the inlet duct 16 and the flow of air taken from the rear end thereof through the outlet duct 94. Any change in these relative inlet and outlet flows of air produces an immediate change in the pressure existing in the intermediate portion of the piping 120. This immediate change in pressure is transmitted through the valve 48 and the pipe 30 to the interior of the case 26 of the control unit 24 so that there will be an immediate compensating action of the control device instead of a delayed operation of the control device 24, resulting when the pipe 130 thereof is connected to the cabin interior.

The control system also includes cascade vessels 92 in series with the inlet ducts 16 and the outlet ducts 94 substantially as shown in Fig. 1, the vessels serving to partially damp the amplitude of relatively short and rapid pressure changes in the cabin caused by surges at the blower inlet and cabin outlet.

A number of safety features must be observed in an aircraft cabin pressure regulation system to insure passenger comfort and operation safety. For example, safety valves 106 are provided in the large exhaust outlets 18 and are set to relieve if the pressure differential exceeds the design limit. A valve of this type may also be arranged to cut out the fresh air flow increase control and/or the outlet valve closing circuit. Non-return valves 108 are provided in the supercharger delivery ducts to prevent reverse flow in event of a compressor failure. A check valve 15 is arranged to open and thus prevent any appreciable suction in the cabin when the airplane descends to altitudes below the pressure equalization altitude. This valve is preferably located in the ram duct wherein upon starting to supercharge it will close as soon as the cabin pressure exceeds the ram pressure.

While I have described my invention in its present embodiments, it will be obvious to those skilled in the art, after understanding my invention, that various changes may be made therein without departing from the scope thereof. I aim in the appended claims to cover all such modifications or changes.

I claim as my invention:

1. In an aircraft, a cabin adapted to be supercharged, a blower for supplying air to said cabin at a pressure higher than that of the ambient flight atmosphere, a compressed air inlet duct from said blower to said cabin, a vitiated air outlet duct from said cabin to the ambient flight atmosphere, a controllable valve in said outlet duct, a cabin pressure regulating device sensitive to cabin pressure and flight pressure, adjustable means on said device for setting said device to respond to an altitude at which cabin pressure is equalized with flight pressure, a conduit for taking pressure from said inlet duct near said blower and transmitting said pressure to said regulating device, a conduit for taking pressure from said outlet duct near said outlet valve and transmitting said pressure to said regulating device, whereby the pressure differential between the inlet duct at the conduit connection and the outlet duct at the conduit connection serves to anticipate cabin pressure changes before such changes are apparent in the said cabin, a primary servo system responsive to said regulating device for opening and closing said outlet valve, and a secondary servo system responsive to positions of said outlet valve for controlling the flow of compressed air from said blower to said cabin.

2. In an aircraft, a cabin adapted to be supercharged above the ambient atmospheric pressure, supercharging means comprising at least one blower, an inlet duct from said blower to said cabin, at least one outlet valve for discharging vitiated air from said cabin, an outlet duct leading from said cabin to said outlet valve, a servo system arranged to control the aperture of said outlet valve, a regulator adapted to normally control said servo system in response to departure of cabin pressure from a value functionally correlated to flight altitude pressure, and an anticipator system responsive to transient air pressure variations in the said inlet and outlet ducts and adapted to accelerate the otherwise normal functioning of the said regulator, the system comprising a conduit connecting the regulator with a region within the said inlet duct adjacent the blower wherein the air flow pressure is higher than cabin pressure, and a conduit connecting the regulator with a region within the said outlet duct adjacent the outlet valve wherein the air flow pressure is lower than cabin pressure, whereby the regulator will respond to transient flow quantity changes within the conduits prior to any appreciable change in cabin pressure as a direct result of said transient pressure variations.

3. In regulating means for an aircraft pressure cabin, the combination of: supercharging means including an inlet duct through which air is delivered into said cabin; an outlet duct leading from said cabin; a flow regulating valve associated with at least one of said ducts; a servo system arranged to control the aperture of said valve; a regulator adapted to normally control said servo system in response to changes from predetermined relation of cabin pressure to external atmospheric pressure; and an anticipator system connected with said regulator and with at least one of said ducts to transmit to said regulator the effects of transient changes in air flow within at least one of said ducts before any appreciable change in pressure of the air within the cabin can occur as a result of said transient changes.

4. In pressure regulating means for an aircraft pressure cabin, the combination of: airflow means for delivering into and taking from the pressure cabin flows of air in such manner that the pressure in said cabin will be controlled, said airflow means including an inlet, means for charging air into the cabin through said inlet, and an outlet path of flow for discharging air from the cabin, and a valve for controlling the discharge of air through said outlet so as to control the pressure in the cabin; and pressure actuated regulating means operating to control said airflow means during flight so as to maintain in said cabin a pressure greater than the external atmospheric pressure, said regulating means having a Pitot tube exposed to the flow of air in said inlet and a venturi in said outlet, and said regulating means having responsive control means subjected to pressure changes in said Pitot tube and said venturi resulting from changes in the rates of flow of air in said inlet and outlet.

5. In pressure regulating means for a pressure cabin, the combination of: airflow means for delivering into and taking from the pressure cabin flows of air in such manner that the pressure in said cabin will be controlled, said airflow means including an inlet, means for charging air into the cabin through said inlet, an outlet, means for discharging air from the cabin, and a valve for controlling the discharge of air through said outlet so as to control the pressure in the cabin; and regulating means operating to control said valve during flight so as to maintain in said cabin a pressure greater than the external atmospheric pressure, said regulating means including pressure responsive control means, and fluid conduit means for transmitting to said pressure responsive control means varying pressures resulting from changes in the flow in said outlet means and normally equal to cabin pressure, said conduit means being adapted to, in response to transient flow changes in said outlet means, transmit to said pressure responsive control means, pressure changes effective thereon before corresponding transient changes in the pressure of the air within the cabin can occur.

6. In an aircraft, a cabin adapted to be supercharged, at least one blower for supplying air to said cabin at a pressure higher than that of the ambient flight atmosphere, a compressed air inlet duct from said blower to said cabin, a vitiated air outlet duct from said cabin to the ambient flight atmosphere, a controllable valve in said outlet duct, a pair of cascade vessels, one being in the inlet duct and one in the outlet duct, said cascade vessels serving to partially damp the amplitude of relatively short and rapid pressure changes in the cabin caused by surges of pressure at the blower inlet and cabin outlet, a regulating device including a chamber in which a simulated cabin pressure is maintained and means in said chamber sensitive to the pressure in said chamber and to flight pressure, adjustable means for setting said regulator to an altitude at which cabin pressure is equalized with flight pressure, a primary servo system responsive to said regulator for opening and closing said outlet valve, a secondary servo system responsive to positions of said outlet valve for controlling the flow of compressed air from said blower to said cabin, whereby the pressure in said cabin is controlled substantially at a ratio of flight altitude pressure to the pressure in said chamber, as gauged from the set equalizing altitude pressure; and means associated with the said regulating device for varying the ratio.

7. In pressure regulating means for a pressurized aircraft cabin, the combination of: airflow means for circulating a flow of air under pressure through the cabin and including pressurizing inlet means, outlet means, valve means for controlling said flow, and pressure sensitive regulator means for controlling said valve means and thereby controlling the pressure in the cabin; and anticipating control means including a Pitot tube and a venturi disposed in said inlet and outlet means respectively and sensitive to transient changes in differential between quantities of flow in said inlet and outlet means respectively, adapted to produce in said regulator means a response to said transient changes before any substantial change in the pressure of the cabin atmosphere can occur as a result of said transient changes.

8. In pressure regulating means for a pressurized aircraft cabin, the combination of: airflow means for circulating a flow of air under pressure through the cabin and including inlet and outlet means, valve means for controlling the release of air through said outlet means, and pressure sensitive regulator means for controlling said valve means and thereby controlling the pressure in the cabin; anticipating control means sensitive to transient changes in differential between quantities of flow in said inlet and outlet means respectively, adapted to produce in said regulator means a response to said transient changes before any substantial change in the pressure of the cabin atmosphere can occur as a result of said transient changes; means for delivering air under pressure into said inlet means; means for quantitatively varying the operation of said delivering means; and means controlled by said outlet control valve means for controlling the operation of said last means.

9. In pressure regulating means for a pressurized aircraft cabin, the combination of: airflow means for circulating a flow of air under pressure through the cabin and including inlet and outlet means, valve means for controlling said flow, and pressure sensitive regulator means for controlling said valve means and thereby controlling the pressure in the cabin; anticipating control means sensitive to transient changes in differential between quantities of flow in said inlet and outlet means respectively, adapted to produce in said regulator means a response to said transient changes before any substantial change in the pressure of the cabin atmosphere can occur as a result of said transient changes; and means to at least partially damp the amplitude of relatively short and rapid changes caused by surges in said inlet and outlet means.

10. In pressure regulating means for a pressurized aircraft cabin, the combination of: airflow means for circulating a flow of air under pressure through the cabin and including pressurizing inlet means, outlet means, and valve means for controlling said flow; regulating means including anticipating control means sensitive to transient changes in differential between quantities of flow in said inlet and outlet means respectively, adapted to adjust said valve means to compensate for said transient changes before any substantial change in the pressure of the cabin atmosphere can occur as a result of said transient changes; and means to at least partially damp the amplitude of relatively short and rapid pressure changes caused by surges in said inlet and outlet means.

11. In pressure regulating means for a pressurized aircraft cabin, the combination of: airflow means for circulating a flow of air under pressure through the cabin and including pressurizing inlet means, outlet means, valve means for controlling the escape of air through said outlet means and thereby controlling the pressure in the cabin; regulating means including anticipating control means sensitive to transient changes in differential between quantities of flow in said inlet and outlet means respectively, adapted to adjust said valve means to compensate for said transient changes before any substantial change in the pressure of the cabin atmosphere can occur as a result of said transient changes; and means controlled by said valve means in at least one position thereof for quantitatively varying the input of said pressurizing inlet means.

12. In pressure regulating means for a pressurized aircraft cabin, the combination of: airflow means for circulating a flow of air under pressure through the cabin and including an inlet, a supercharger for delivering air under pressure to said inlet, outlet means including a valve for permitting the controlled escape of air from the cabin and thereby controlling the pressure in the cabin; regulating means including anticipating control means sensitive to transient changes in differential between quantities of flow in said inlet and outlet means respectively, adapted to modify the position of said valve to compensate for said transient changes before any substantial change in the pressure of the cabin atmosphere can result therefrom; inlet valve means for quantitatively varying the input from said supercharger; servo motor means for operating said inlet valve means; and auxiliary control means including an electric switch operated by said outlet valve means, for controlling the operation of said servo motor in response to changes in condition in said outlet means.

13. In pressure regulating means for an aircraft pressure cabin, the combination of: airflow means for delivering into and taking from the pressure cabin flows of air in such manner that the pressure in said cabin will be controlled, said airflow means defining an inlet path of flow for charging the air and an outlet path of flow for discharging air; regulating means automatically operable to control said airflow means during flight so as to maintain in said cabin a pressure greater than the external atmospheric pressure; and pressure actuated anticipating control means connected to said regulating means and having a Pitot tube exposed to the flow of air in said inlet path and a venturi in said outlet path, said regulating means having responsive control means subjected to the varying effects of the pressure changes in said Pitot tube and said venturi resulting from changes in the rates of flow of air in said inlet and outlet paths.

14. Means for regulating the pressure of the air within an aircraft cabin, comprising: airflow means for circulating air under pressure in the cabin and including inlet and outlet means and a valve for controlling such circulation and thereby controlling the pressure of the air in the cabin; regulating means for controlling the aperture of said valve, including a pair of pressure responsive elements and servo mechanism for transmitting the response of said elements to said valve; and cabin pressure change anticipating means including a pitot in said inlet means, a venturi in said outlet means, and conduit means leading from said pitot and venturi for directly subjecting said responsive elements to variations in pressure resulting directly from changes in the flows in said inlet and outlet means, one of said pressure responsive elements being sensitive to both ambient atmospheric pressure and the pressure imposed thereon by said conduit means and the other of said pressure responsive elements being sensitive only to the pressure imposed thereon by said conduit means, said cabin pressure change anticipating means being adapted normally to cause the pressure to which said responsive elements are subjected to substantially equal cabin pressure and being adapted, in response to transient changes in the flows in said inlet and outlet means, to effect stabilizing adjustment of the aperture of said valve before corresponding transient changes in the pressure of the air within said cabin can occur, said cabin pressure change anticipating means including a pitot in said inlet means and a venturi in said outlet means.

BRUCE E. DEL MAR.